United States Patent
Nakayama et al.

(10) Patent No.: US 8,555,863 B2
(45) Date of Patent: Oct. 15, 2013

(54) CONTROL DEVICE FOR INTERNAL COMBUSTION ENGINE

(75) Inventors: Yusuke Nakayama, Gotemba (JP); Yoshihisa Shinoda, Susono (JP); Keisuke Sano, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 13/514,472

(22) PCT Filed: Mar. 9, 2010

(86) PCT No.: PCT/JP2010/053869
§ 371 (c)(1),
(2), (4) Date: Jun. 7, 2012

(87) PCT Pub. No.: WO2011/111164
PCT Pub. Date: Sep. 15, 2011

(65) Prior Publication Data
US 2012/0245825 A1    Sep. 27, 2012

(51) Int. Cl.
*F01P 7/16* (2006.01)
*F02D 41/00* (2006.01)

(52) U.S. Cl.
USPC ........... 123/525; 123/578; 123/673; 701/103; 701/109; 701/114

(58) Field of Classification Search
USPC .................. 123/525, 575, 576, 577, 578, 673, 123/679–682, 685, 690–692; 701/103, 107, 701/109, 113–114
See application file for complete search history.

(56) References Cited

U.S. PATENT DOCUMENTS

| | | | | |
|---|---|---|---|---|
| 5,755,211 A | * | 5/1998 | Koch | 123/525 |
| 6,145,494 A | * | 11/2000 | Klopp | 123/525 |
| 6,289,881 B1 | * | 9/2001 | Klopp | 123/525 |
| 6,321,694 B1 | * | 11/2001 | Vergine et al. | 123/27 GE |
| 6,371,092 B1 | * | 4/2002 | Guglielmo et al. | 123/527 |
| 7,581,528 B2 | * | 9/2009 | Stein et al. | 123/431 |
| 8,091,538 B2 | * | 1/2012 | Hartmann et al. | 123/690 |
| 8,261,721 B2 | * | 9/2012 | Mizuno et al. | 123/479 |
| 8,275,538 B2 | * | 9/2012 | Surnilla et al. | 701/113 |

(Continued)

FOREIGN PATENT DOCUMENTS

| | | |
|---|---|---|
| JP | 2003-120386 A | 4/2003 |
| JP | 2006-266160 A | 10/2006 |

(Continued)

OTHER PUBLICATIONS

International Search Report of PCT/JP2010/053869 dated Apr. 20, 2010.

*Primary Examiner* — Thomas Moulis
(74) *Attorney, Agent, or Firm* — Sughrue Mion, PLLC

(57) ABSTRACT

A control device is applied to an internal combustion engine capable of using CNG and gasoline by switching therebetween, and the CNG and the gasoline are associated, as fuel for use, with one and the other of two driving areas respectively, the driving areas being different from each other. The control device exceptionally switches the fuel for use from gasoline to CNG and implements an air-fuel ratio imbalance inspection (S6, S7), when the air-fuel ratio imbalance inspection is required for a CNG mode using CNG (S1), the engine is driving in a driving area (AR2) correlated to gasoline as fuel for use (S2), and gasoline mode using gasoline as fuel for use is ongoing (S3).

8 Claims, 5 Drawing Sheets

(56) References Cited

U.S. PATENT DOCUMENTS

| | | | |
|---|---|---|---|
| 2002/0134362 A1* | 9/2002 | Deutsch | 123/575 |
| 2004/0139944 A1* | 7/2004 | Nakano et al. | 123/406.47 |
| 2008/0110447 A1 | 5/2008 | Wakahara et al. | |
| 2012/0029788 A1* | 2/2012 | Shinoda | 701/102 |
| 2012/0143480 A1* | 6/2012 | Pursifull | 701/105 |

FOREIGN PATENT DOCUMENTS

| | | |
|---|---|---|
| JP | 2007-051604 A | 3/2007 |
| JP | 2008-121533 A | 5/2008 |
| JP | 2010-038066 A | 2/2010 |

* cited by examiner

CONTROL DEVICE FOR INTERNAL COMBUSTION ENGINE

CROSS REFERENCE TO RELATED APPLICATIONS

This application is a National Stage of International Application No. PCT/JP2010/053869 filed Mar. 9, 2010, the contents of all of which are incorporated herein by reference in their entirety.

TECHNICAL FIELD

The present invention relates to a control device for internal combustion engine which is applied to an internal combustion engine capable of switching among plural kinds of fuel for use.

BACKGROUND ART

Well known are internal combustion engines capable of switching depending on states, among plural kinds of fuel for use or changing a mixture ratio of a plural kinds of fuel. As a control device for such an internal combustion engine, there is known a control device which detects a combustion state has become an inappropriate state with a sensor and changes a mixture ratio or an ignition timing so that the combustion state changes from the inappropriate state to an appropriate state (Patent Literature 1). In addition, as an internal combustion engine capable of switching among plural kinds of fuel for use, there is known an internal combustion engine which switches, when it is determined that air pollutants reach a high density in exhaust air, to fuel having a little amount of air pollutants (Patent Literature 2).

CITATION LIST

Patent Literature

PTL 1: JP-2003-120386 A
PTL 2: JP 2006-266160 A

SUMMARY OF INVENTION

Problem to be Solved by Invention

In a case that the internal combustion engine capable of switching the kinds of fuel for use, each kind of fuel for use is correlated to each driving area and the switch of fuels is executed based on the correlation. With respect to such an internal combustion engine, an inspection is executed for each kind of fuel for use, if the inspection has a characteristic that inspection accuracy does not change depending on the driving areas, appropriate inspection accuracy is obtained for each of the driving modes which differs in the kinds of fuel for use from each other. However, in a case that an inspection has a characteristic that inspection accuracy changes depending on the driving areas, as the check accuracy depends on the driving areas of the internal combustion engine, the inspection accuracy for a driving mode in which a specific fuel for use is used would get lower than that in other driving modes. Because of this, the inspection, in which appropriate inspection accuracy is ensured for each of the driving modes which differs in the kinds of fuel for use from each other, is impossible to be executed, is likely to be impossible to be executed.

Then, the present invention aims to provide a control device for internal combustion engine capable of ensuring appropriate inspection accuracy for each of the driving modes which differs in the kinds of fuel for use from each other in a case that an inspection is executed for each fuel for use with respect to an internal combustion engine capable of switching plural kinds of fuels for use.

Solution to Problem

A control device of the present invention is a control device for internal combustion engine which is applied to an internal combustion engine capable of switching a plural kinds of fuel, comprising: a storage device which stores information where each fuel for use to be used is correlated to each driving area of the internal combustion engine; a fuel switch device which switches the fuel for use based on the information stored in the storage device; and an inspection device which implements for each of driving modes different from each other in the fuel for use, an inspection having a characteristic such that inspection accuracy changes depending on the driving areas different from each other, wherein the fuel switch device, when the inspection device implements the inspection, switches the fuel for use so that same level inspection accuracy is ensured in any driving mode, regardless of a correlation between the driving area and the fuel for use correlated by the information.

According to this control device, in a case that an inspection is implemented for an internal combustion engine capable of switching fuel for use based on a correlation of each driving area and each kind of fuel for use, the correlation being defined beforehand, it is possible to switch exceptionally the fuel for use regardless of the correlation of the driving area and the fuel for use, so that inspection accuracy of same level is ensured for each driving mode using different fuel for use from each other. Because of this, even if there is an inspection for particular fuel for use being correlated to a driving area where it is difficult to ensure an appropriate inspection accuracy, it is not necessary to implement the inspection in such driving area. Accordingly, since it is possible to avoid deterioration of inspection accuracy of the inspection for the particular fuel for use, it is possible to implement the inspection where appropriate inspection accuracy is ensured for each driving mode.

As one embodiment of the present invention, a first fuel and a second fuel may be provided as the plural kinds of fuel, the first fuel and the second fuel may be correlated to a first driving area and a second driving area as the fuel for use respectively, the inspection may have a characteristic such that the inspection accuracy of a case where the inspection is implemented in the first driving area is lower the inspection accuracy of a case where the inspection is implemented in the second driving area, and the fuel switch device may switch the fuel for use from the second fuel to the first fuel, when the inspection device should implement the inspection for the driving mode using the first fuel, in a case that the driving mode using the second fuel is ongoing in the second driving mode. According to this embodiment, regardless of the information that the first fuel is correlated to the first driving area, in a case that the inspection for the driving mode using the first fuel should be implemented, the fuel for use is switched from the second fuel to the first fuel in the second driving area. As the result of that, the inspection for the driving mode using the first fuel is implemented in the second driving area. Because of this, never deteriorates the inspection accuracy of the inspection for the driving mode using the first fuel. Accordingly, it is possible to implement the inspection where the inspection accuracy of same level is ensured for each of the driving mode using the first fuel and the driving mode using the second fuel.

It does not matter which kinds of the first fuel and the second fuel are, as long as the kinds of them are different from each other. It does not matter which kind of driving area is correlated to each fuel. For example, the first fuel may be smaller than the second fuel in an exhaust amount of harmful substance after combustion, and the first driving area may be lower than the second driving area in purification performance of harmful substance. The driving area where the purification performance of harmful substance is low is an area where a driving state of the internal combustion engine is unstable, such as a starting moment which is a moment before the engine temperature of the internal combustion engine increases adequately, and a moment before activation of catalyst. If the first fuel is used in such area, it is possible to reduce the exhaust amount of harmful substance. Then, since the inspection for the driving mode using the first fuel is implemented in the second driving area, which is stable, where the purification performance of harmful substance is high, it is possible to avoid the deterioration of inspection accuracy. There are various kinds of variations as the first fuel and the second fuel which conform to the above situation. For example, compressed natural gas may be provided as the first fuel, and hydrocarbon system liquid fuel may be provided as the second fuel.

As the inspection the inspection accuracy of which changes depending on the driving areas different from each other, for example, there is an inspection where quantitative amounts of required time, angular velocity and the like for each predetermined crank angle of the internal combustion engine, are measured for a constant term, and an abnormal state is detected from the fluctuation state of those quantitative amounts. With respect to such kind of inspection, when the driving state of internal combustion engine is unstable, it is difficult to measure accurately the fluctuation state of the quantitative amounts, and thereby, the inspection accuracy become worse. Concretely, an accident fire inspection of the internal combustion engine corresponds to such kind of inspection. In addition, as one embodiment of the control device of the present invention, the internal combustion engine may have a plurality of cylinders, and the inspection device may implement a process for detecting abnormal dispersion between air-fuel ratios of the cylinders. Also, with respect to the inspection for detecting the abnormal dispersion of air-fuel ratios, since the fluctuation state of quantitative amount of required time and angle velocity for each predetermined crank angle is grasped in a similar way to a case of accident fire inspection, the inspection accuracy changes depending on the driving areas of the internal combustion engine different from each other.

As one embodiment of the control device of the present invention, the internal combustion engine may be constructed so as to use mix fuel where the first fuel and the second fuel are mixed, and the control device further may comprise: a restriction time control device which controls the internal combustion engine in a case that the inspection device should implement the inspection for the driving mode using the first fuel, so that the fuel for use is changed to the mix fuel, when ongoing is the driving mode using the second fuel in the second driving area and usage of the first fuel should be restricted; and an inspection result presumption device which presumes an inspection result for the driving mode using the first fuel in a state that the internal combustion engine is controlled in a driving mode using the mix fuel by the restriction time control device, by comparing an inspection result of the inspection implemented for the driving mode by the inspection device to an inspection result for the driving mode using the second fuel. According to the above embodiment, it is possible to presume the inspection result of the driving mode using the first fuel from the inspection result of the driving mode using the mix fuel where the first fuel and the second fuel are mixed. Accordingly, it is possible to obtain a result equivalent to a case that the inspection is implemented after switching the fuel for use of all cylinders from the second fuel to the first fuel to implement the inspection while the consumption amount of the first fuel being suppressed in compliance with the usage restriction of the first fuel.

As one embodiment of the control device of the present invention, compressed natural gas and hydrocarbon system liquid fuel may be provided as the plural kinds of fuel, the internal combustion engine may have a plurality of cylinders and capable of switching the fuel for use for each cylinder, and the inspection device may implement, as the inspection, processes of detecting abnormal dispersion between air-fuel ratios of the cylinders, and when the abnormal dispersion is detected, specifying an abnormal cylinder in which the air-furl ratio is deviated to either a lean side or a rich side, wherein the control device further may comprise a combustion control device which controls the internal combustion engine so that, in a case that the inspection device has detected the abnormal dispersion while a driving mode using the compressed natural gas as the fuel for use is implemented in all of the cylinders, the hydrocarbon system liquid fuel is added to the abnormal cylinder where the air-fuel ratio is deviated to the lean side, and the fuel for use is switched from the compressed natural gas to the hydrocarbon system liquid fuel for the abnormal cylinder where the air-ratio is deviated to the rich side. When the abnormal dispersion between cylinders is detected, switching the fuel for use of all cylinders leads only a state where only hydrocarbon system liquid fuel is used, and thereby, a cursing distance is made shorter. According to this embodiment, in a case that the abnormal dispersion between air-fuel ratios of cylinders is detected by the inspection device, the fuel is added to the abnormal cylinder or the fuel for use of the abnormal cylinder is switched without switching the fuel for use of all cylinders. Because of this, the operation object is limited. Accordingly, it is possible to remedy the abnormal dispersion between the cylinders while continuing the use of compressed natural gas as long as possible and extending the cruising distance.

In the above embodiment, the combustion control device may control the internal combustion engine so that the fuel for use in all of the cylinders is switched from the compressed natural gas to the hydrocarbon system liquid fuel, in a case that the abnormal dispersion is not remedied even if at least either adding the hydrocarbon system liquid fuel to the abnormal cylinder or switching the fuel for use of the abnormal cylinder is implemented. In this case, since the fuel for use of all cylinders are switched from compressed natural gas to hydrocarbon system liquid fuel, it becomes easy to remedy the abnormal dispersion between the cylinders. As the hydrocarbon system liquid fuel, gasoline, light gal oil, alcohol, mix fuel of gasoline and alcohol, or the like can be applied.

EMBODIMENT FOR EXECUTING INVENTION

The First Embodiment

Figure 1:
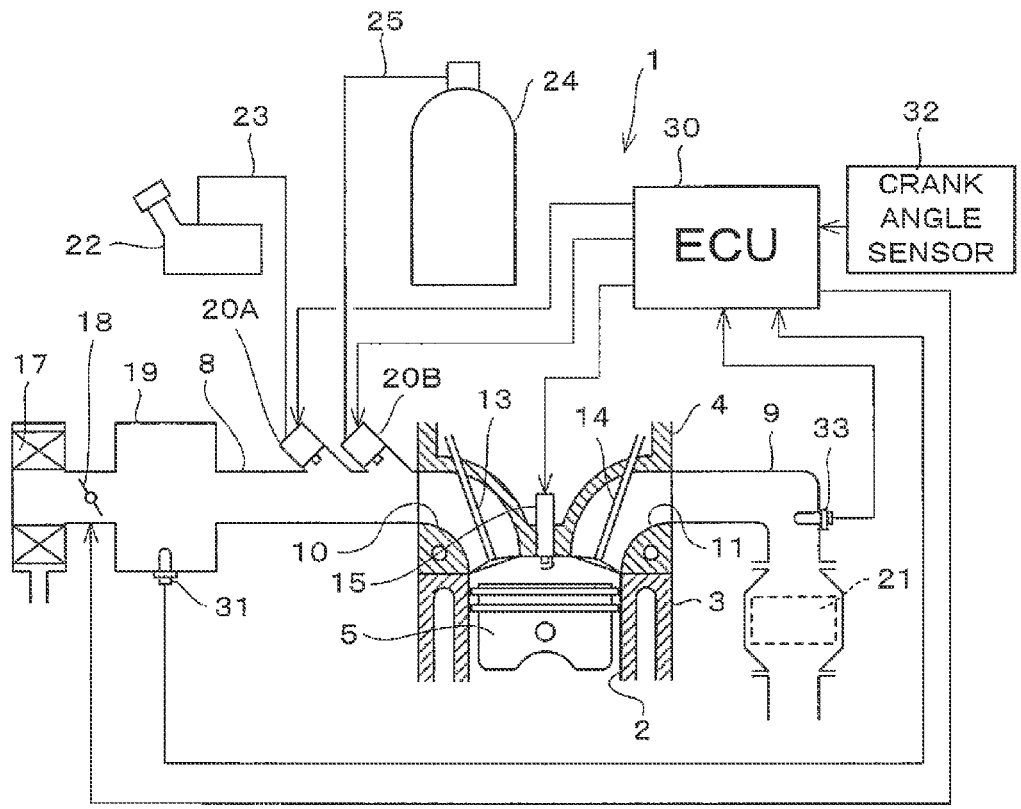
FIG. 1 A diagram showing a substantial part of an internal combustion engine to which a control device according to the first embodiment is applied.

FIG. 1 shows a substantial part or an internal combustion engine to which a control device according to the first embodiment of the present invention is applied. The internal combustion engine 1 is configured as a spark-ignition internal combustion engine of a four-cylinder-four-cycle type having four cylinders 2 (FIG. 1 shows one of them), and capable of being installed to a vehicle as a driving source for travel. The internal combustion engine 1 is configured as a bi-fuel engine capable of switching plural kinds of fuel for use, and the internal combustion engine 1 can use compressed natural gas (CNG) as hydrocarbon system gas fuel and gasoline as hydrocarbon system liquid fuel.

The internal combustion engine 1 comprises a cylinder block 3 where the cylinder 2 is formed, a cylinder head 4 mounted to the cylinder block 3 so as to close an open portion of each cylinder 2, and a piston 5 provided inside the cylinder 2 in a reciprocatory manner. To each cylinder 2, an intake passage 8 and an exhaust passage 9 are connected. The intake passage 8 is formed in the cylinder head 4 and has an intake port 10 opening to the cylinder 2, and the exhaust passage 9 is formed in the cylinder head 4 and has an exhaust port 11 opening to the cylinder 2. The intake port 10 is opened and closed by an intake valve 13 and the exhaust port 11 is opened and closed by an exhaust valve. Inside each cylinder 2, the ignition plug 15, which makes air-fuel mixture ignite with which the cylinder 2 is filled, is provided in a state that the top thereof faces to the inside of the cylinder 2.

In the intake passage 8, an air-cleaner 17 filtering intake air, a throttle valve 18 controlling an intake air amount, a serge tank 19 reducing a pulsing motion of intake air, and two kinds of fuel injection valves 20A, 20B injecting the fuel into the intake passage 8. The fuel injection valves 20A, 20B are provided to each cylinder 2. The exhaust passage 9 is provided with a three-way catalyst 21 as the exhaust purification device for purifying noxious materials in exhaust gas.

The fuel injection valve 20A for the liquid fuel is connected to a fuel tank 22 via a liquid fuel passage 23. The liquid fuel passage 23 is provided with a fuel pump, not illustrated, for pumping to the fuel injection valve 20A, gasoline as the second fuel held in the fuel tank 22. The fuel injection valve 20B for gas fuel is connected to a fuel bottle 24 via a gas fuel passage 25. In the fuel bottle 24, the CNG as the second fuel is filled in a pressurized state. The gas fuel passage 25 is provided with a regulator (a pressure adjustor), not illustrated, for pumping gas having a predetermined pressure to the fuel injection valve 20B even if the CNG pressure of the fuel bottle changes. Each of the fuel injection valves 20A, 20B is configured as a fuel injection valve of electromagnetic driven type. The operations of each fuel injection valve 20A, 20B are controlled by an engine control unit (ECU) 30.

The ECU 30 is configured as a computer for controlling appropriately the internal combustion engine 1. Although the illustration is omitted, the ECU 30 compromises a micro processor as a main calculation device and peripheral devices necessary for operations of the micro processor, the peripheral devices including a storage device such as a ROM and a RAM and an input/output port and the like. The ECU 30 controls the fuel injection amount and the switch of fuel by operations of the fuel injection valves 20A, 20B, as well as controlling the ignition timing by operations of the ignition plug 15, operations of the throttle valve 18 in accordance with accelerator position and the like. In order to control various kinds of controls to the internal combustion engine 1, various kinds of information from various sensors are inputted to the ECU 30. For example, connected to the ECU 30 are an air flow meter 31, a crank angle sensor 32, and an oxygen density sensor 33. The air flow meter 31 outputs a signal in accordance with the intake air amount. The crank angle sensor 32 outputs a signal in accordance with a rotation number (a rotational speed) of the internal combustion engine 1. The oxygen density sensor 33 outputs a signal in accordance with the air-fuel ratio.

Figure 2:
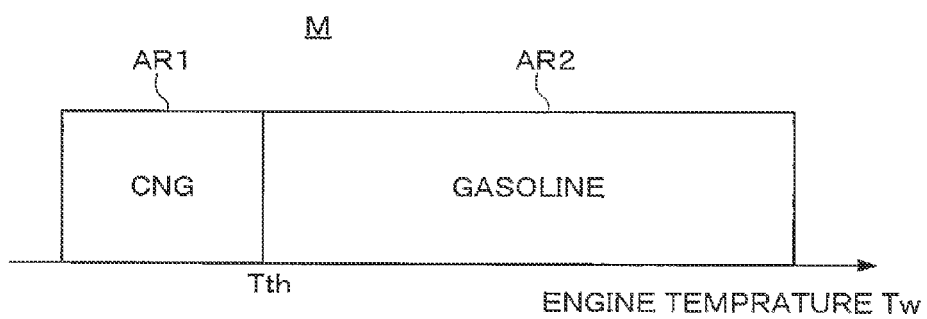
FIG. 2 A conceptual diagram showing visually one example of fuel map

Although the ECU 30 implements various kinds of control operations, only control operations relating to the present invention will be described in this description, and the explanations for control operations having little relation with the present invention will be omitted. The ECU 30 switches appropriately the fuel for use between CNG and gasoline in response to a fuel switch requirement. The switch of fuel for use is executed based on a fuel for use map where each fuel for use is correlated to each driving area of the internal combustion engine 1, that is, to each area decided by various kinds of driving parameters. The fuel for use map is made from various kinds of aspects. FIG. 2 shows one example of the fuel for use map determined from an aspect of exhaust performance.

FIG. 2 is a conceptual diagram showing visually one example of the fuel for use map. As illustrated, the fuel for use map M is one dimension map having one parameter of engine temperature. The fuel for use map M corresponds to information of the present invention. The ECU 30 storing the map M functions as a storage device of the present invention. In the fuel for use map M, two driving areas AR1, AR2 are set to the engine temperature Tw so that a threshold value Tth becomes a border of the areas. The map M correlates CNG as the fuel for use to the driving area AR1 where the engine temperature Tw is less than the threshold value Tth, and also correlates the gasoline as the fuel for use to the driving area AR2 where the engine temperature Tw is not less than the threshold value Tth.

The threshold value Tth is the lowest value of engine temperature at which it can be assumed that an warming-up time of the internal combustion engine 1 has completed and the three-way catalyst 21 has been activated. Accordingly, while a purification performance of the three-way catalyst 21 is inadequate in the driving area AR1 where the engine temperature is less than the threshold value Tth, the three-way catalyst can perform its purification performance adequately in the driving area AR2 where the engine temperature Tw is not less than the threshold value Tth. That is, the purification performance of the internal combustion engine 1 of the driving area AR1 is lower than that of the driving area AR2. The fuel for use map M correlates CNG, the emission amount of harmful substances of which is less than that of gasoline, to the driving area AR1. Therefore, by switching the fuel for use based on the map M, the emission performance of the internal combustion engine 1 improves. In a case that the operating point of the internal combustion engine 1 changes so as to pass across the threshold value Tth, a switch requirement from CNG to gasoline or a switch requirement from gasoline to CNG is generated. Then, based on those switch requirements, the ECU 30 operates each of the fuel injection valves 20A, 20B to switch the fuel for use. In addition to the fuel for use map determined from an aspect of emission performance, prepared in the ECU 30 are various kinds of fuel for use maps determined from various aspects such as an output requirement and a fuel cost performance, but the explanations thereof are omitted.

The ECU 30 also has, from an aspect of maintaining safety, a function as an on-board diagnostic system (OBD) to diagnose and inform users such as a driver of various troubles in the internal combustion engine 1. The ECU 30 diagnoses various kinds of items. As diagnostic items relating to the present invention, there are a firing trouble caused by dispersion of air-fuel ratios of the cylinders and a firing trouble caused by accidental fire and the like. As the diagnostic items other than the firing troubles, also diagnosed are troubles of auxiliary machines such as deterioration of the three-way catalyst 21 and defect of the oxygen density sensor 33. In a case that the ECU 30 as an inspection device implements an inspection as a basis of those trouble diagnoses, the inspection relates closely to the operation state of the internal combustion engine 1. Namely, as the inspection is implemented during the driving of the internal combustion engine 1, if the driving state of internal combustion engine 1 is unstable, the inspection result thereof also becomes unstable and the inspection accuracy becomes worse. In a case that the fuel for use is switched based on the map M shown in FIG. 2, in the driving area AR1 where the warming-up time does not complete, the engine temperature is lower than the temperature after the warming-up time. Thereby, the driving state of internal combustion engine 1 is likely to be unstable. Because of this, in a case that the inspection is implemented for each of the driving modes which differ in the fuel for use from each other in accordance with the correlation specified in the map M, it could occur that the inspection accuracy of the driving mode where CNG correlated to the driving area AR1 is set as fuel for use is lower than the inspection accuracy of the driving mode where gasoline is set as fuel for use.

Figure 3:
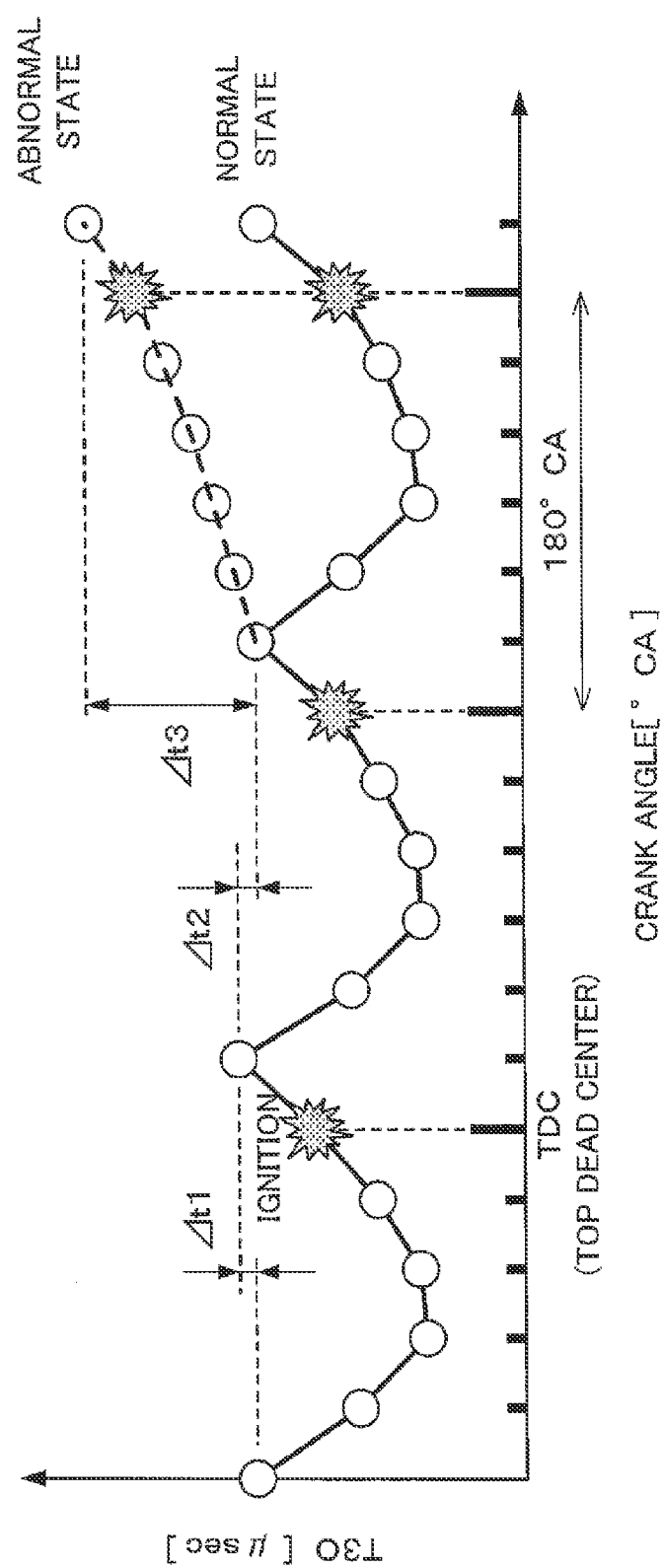
FIG. 3 An explanatory diagram explaining an inspection method of air-fuel ratio imbalance inspection.

As one example of inspection implemented by the ECU 30, there will be described the air-fuel ratio imbalance inspection for inspecting the dispersion between air-fuel ratios of the cylinders. FIG. 3 is an explanation diagram for explaining an inspection method of the air-fuel ratio imbalance inspection. As illustrated, the ECU 30 sequentially measures based on output signals of the crank angle sensor 32, the time necessary for a rotation of a predetermined crank angle (for example, 30 degree). This time is defined as "T30". As the internal combustion engine 1 has four cylinders, the ignition timing (the top dead center) for each cylinder 2 sequentially comes for each 180-degree. Then, a comparison criterion of T30 of each cylinder 2 is set to 30-degree after the top dead center. As illustrated, the difference between the T30 with respect to the 30-degree after the present top dead center and the T30 with respect to one ignition before (180-degree before the present) is calculated sequentially. This difference is defined as $\Delta t$. If there is dispersion of air-fuel ratios of the cylinders, the output fluctuation gets bigger compared with a normal state. For example, as shown as a broken line, in a case that the output of a certain period lowers and the T30 gets bigger than that of the other period, $\Delta t3$ becomes bigger than $\Delta t1$ and $\Delta t2$. Each of $\Delta t1$, $\Delta t2$ . . . calculated sequentially is compared with a criterion value, which is the upper limit of allowed dispersion range. In a case that any one of $\Delta t1$, $\Delta t2$ . . . exceeds the criterion value, it is assumed that the dispersion of air-fuel ratios of the cylinders has occurred. In the illustrated example, $\Delta t1$ and $\Delta t2$ are the dispersions within the allowed range, and $\Delta t3$ is the dispersion exceeding the allowed range. Namely, the criterion value exists between $\Delta t2$ and $\Delta t3$.

In this way, the air-fuel ratio imbalance inspection detects the dispersion between the air-fuel ratios of the cylinders based on the dispersion state of the output of the internal combustion engine 1. Because of this, when the operation state of the internal combustion engine 1 is unstable, affections of the other causes making the dispersion of the output bigger. Thereby, the inspection accuracy gets worse. As the driving area AR1 shown in FIG. 2 is a state that the warming-up time has not completed, if the air-fuel ratio imbalance inspection is implemented in the driving area AR1, the other causes, such as the dispersion of inside temperatures of cylinders 2, could affect the dispersion of the output. Thereby, the inspection accuracy gets lower compared with a case that the inspection is implemented in the driving area AR2. Then, in a case of implementing an inspection for each of the driving modes; the driving mode (a CNG mode) using CNG as fuel for use, and the driving mode (a gasoline mode) using gasoline as fuel for use, an inspection, like the air-fuel ratio imbalance inspection, having a characteristic that inspection accuracy changes depending on the driving areas different from each other, the ECU 30 implements the following control operations so as to equalize the levels of inspection accuracy in those driving modes to each other. In the following explanation, there will be described the air-fuel ratio imbalance inspection, but the same control operations are possible to be implemented also for the various kinds of inspections above mentioned.

Figure 4:
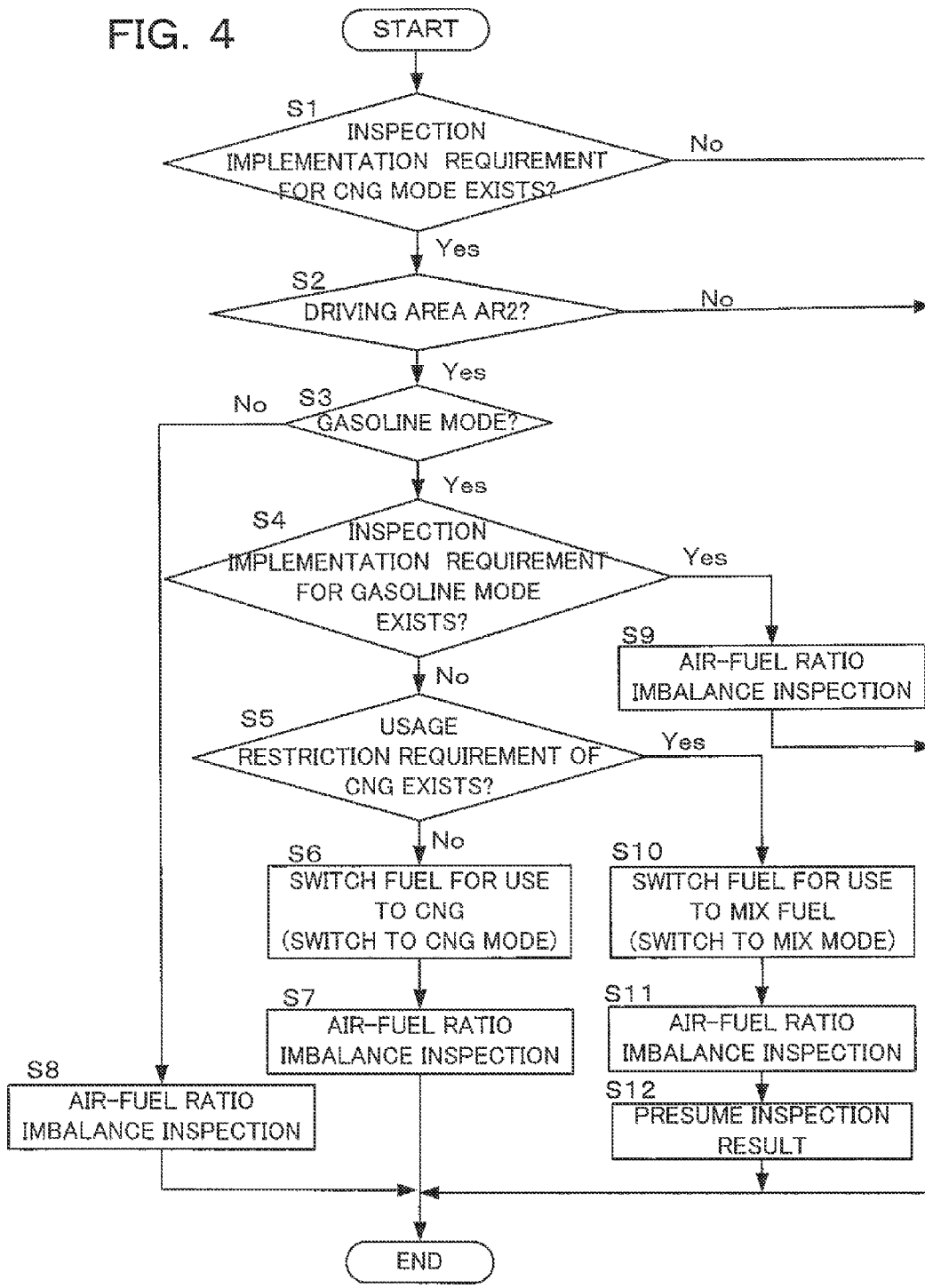
FIG. 4 a flow chart showing one example of control routine according to the first embodiment.

FIG. 4 shows a flowchart of an example of control routine according to the first embodiment. The program of this control routine is stored in the ECU 30, and loaded at an appropriate timing and implemented repeatedly at a predetermined interval. The ECU 30 functions as a fuel switch device of the present invention by implementing the control routine shown in FIG. 3 while switching the fuel for use based on the map M shown in FIG. 2.

At step S1, it is determined whether an inspection implementation requirement for the CNG mode exists. In this inspection implementation requirement is generated by the ECU 30 so that the inspection for the CNG mode is implemented at a predetermined frequency based on accumulated driving time. It is also determined whether the inspection implementation requirement exists by determining whether the inspection for the CNG mode has been already done. In a case that the inspection implementation requirement exists, the process goes to step S2; otherwise, the following processes are skipped and the routine for this time is terminated.

At step S2, it is determined whether the internal combustion engine 1 is driving in the driving area AR2 (refer to FIG. 2) correlated with the gasoline as the fuel for use. This determination may be implemented by referring to the process result of switch control (not illustrated) of the fuel for use, the switch control being implemented in parallel with the control routine shown in FIG. 4. In addition, it can be also determined whether the internal combustion engine 1 is driving in the driving area AR2 or not, by detecting, at step S2, the engine temperature represented by a coolant water temperature, and referring to the map M shown in FIG. 2.

At step S3, it is determined whether the present driving mode is the gasoline mode where the gasoline is the fuel for use. This determination can be also implemented by referring to the process result of switch control of the fuel for use. In a case that the present driving mode is the gasoline mode, the process goes to step S4. In the internal combustion engine 1, the CNG mode could be implemented in the driving area AR2. Because of this, in a case that it is determined at step S3 that the driving mode is not the gasoline mode, the process goes to step S8 and the air-fuel ratio imbalance inspection for the CNG mode is implemented in the driving area AR2.

At step S4, it is determined whether an inspection implementation requirement for the gasoline mode exists or not. This inspection implementation requirement is also generated by the ECU 30 in the same way as the case of step S1. If the inspection implementation requirement exists, the process goes to step S9 to implement the air-fuel imbalance inspection for the gasoline mode in the driving area AR2. The determination of step S4 is also accomplished by determining whether the inspection for the gasoline mode has been already done. Thereby, it is possible to avoid such a case that the process can not go to step S5 (the inspection for the CNG mode can not be implemented) because of taking long time for implementing the process of step S9 when this routine is repeated. On the other hand, in a case that no inspection implementation requirement exists, the process goes to step S5.

At step S5, it is determined whether a usage restriction requirement of CNG exists or not. This usage restriction requirement is generated by the ECU 30, in a case that satisfied are conditions which indicate a consideration that the consumption of CNG should be reduced, for example, a case that the remaining amount of CNG has become inadequate and the like. In a case that the usage restriction requirement of CNG exists, the process goes to step S10 to implement a restriction time control which will be mentioned later. On the other hand, in a case that no usage restriction requirement of CNG exists, the process goes to step S6.

At step S6, each of the fuel injection valves 20A, 20B is operated so that the fuel for use of the internal combustion engine 1 is switched from gasoline to CNG. Thereby, the CNG mode is implemented in the driving area AR2, regardless of the correlation such that gasoline is correlated to the driving area AR2 as the fuel for use. At the subsequent step S7, the air-fuel ratio imbalance inspection for the CNG mode is implemented in the driving area AR2. After that, the routine for this time is terminated.

Steps S10 to S12 are processes for functioning the ECU 30 as the restriction time control device and the inspection result presumption device respectively. At step S10, in order to reduce the consumption of CNG, the internal combustion engine 1 is controlled so that the fuel is switched to mix fuel of CNG and gasoline. A mix ratio of CNG and gasoline may be a constant value or may be changed in accordance with a requirement degree of CNG usage restriction.

At step S11, the air-fuel ratio imbalance inspection for the driving mode using the mixed fuel (a mix mode) is implemented in the driving area AR2. At the subsequent step S12, a result of the inspection for the CNG mode is presumed based on the result of inspection of step S11. The presumption method is as follows. First, the dispersion between outputs of cylinders (see FIG. 3) as the result of inspection for the gasoline mode is stored as reference data. Next, the result of inspection (the dispersion between outputs of cylinders) for the mix mode of step S11 is compared to the reference data stored beforehand. Further, considering the mix ratio of CNG and gasoline at the moment of executing the process of step S11, calculated is extent of contribution that CNG has affected the result of inspection of step S11. The result of inspection for the CNG mode is presumed based on the extent of contribution. Thereby, it is possible to obtain the result of same degree as a case that the inspection is implemented after switching the fuel of all cylinders from gasoline to CNG, while suppressing the consumption amount of CNG in compliance to the usage restriction of CNG.

According to the first embodiment, by implementing the control routine shown in FIG. 4, the air-fuel ratio imbalance inspection is implemented in the driving area AR2 for each of the CNG mode and the gasoline mode, regardless of the correlation between the driving area and the fuel for use specified by the map M of FIG. 2. Accordingly, as the inspection accuracy of the inspection for each driving mode becomes the same level as each other, it is possible to avoid inconvenience that the inspection accuracy for the CNG mode is lower than the inspection accuracy for the gasoline mode. Because of this, it is impossible to implement for the CNG mode, the air-fuel ratio imbalance inspection where appropriate accuracy is ensured.

Second Embodiment

Figure 5:
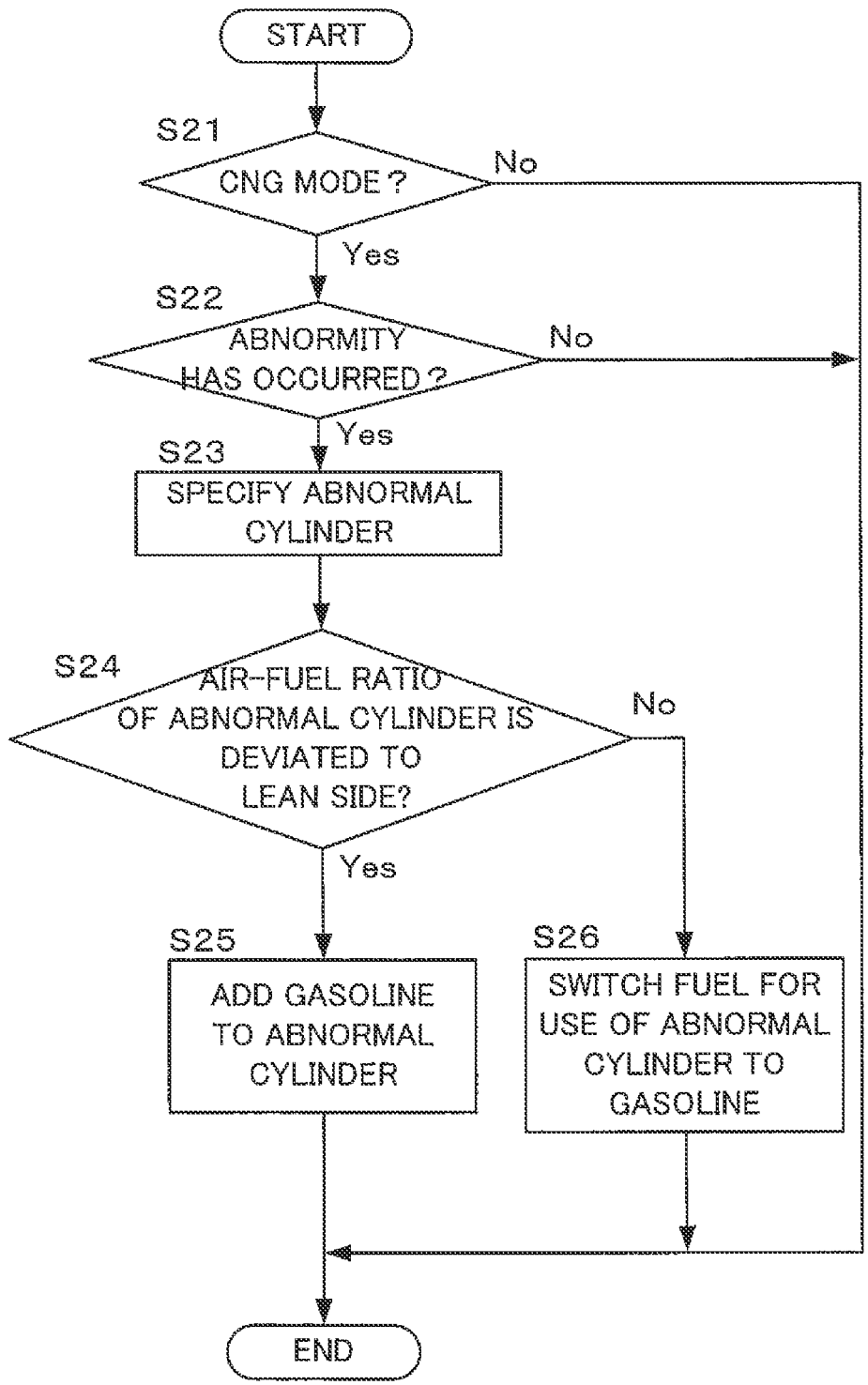
FIG. 5 a flow chart showing one example of control routine according to the second embodiment.
Figure 6:
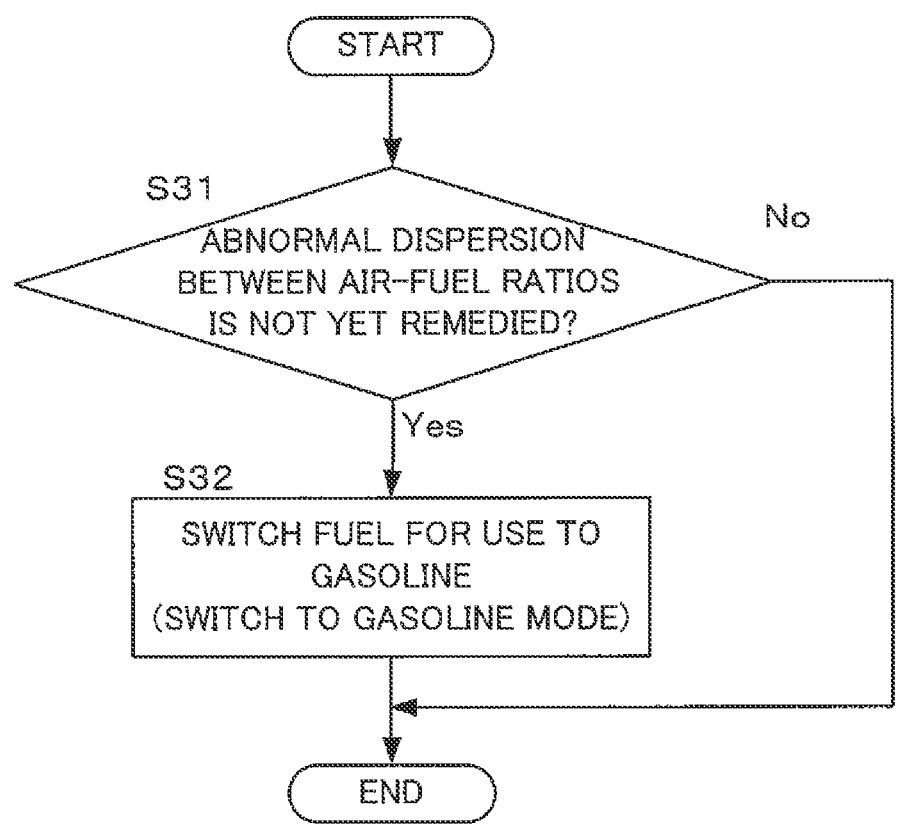
FIG. 6 a flow chart showing one example of control routine according to the second embodiment, which is executed in parallel with the control routine shown in FIG. 5.

Next, while referring to FIGS. 5 and 6, will be described the second embodiment of the present invention. The second embodiment is the same as the first embodiment except that control routines of FIGS. 5 and 6 are implemented together with the control routine of FIG. 4 in the first embodiment. Accordingly, physical constructions for the second embodiment are shown by FIG. 1. FIG. 5 is a flowchart showing one example of control routine in the second embodiment. A computer program of the control routine is stored in the ECU 30, and is loaded at an appropriate timing to be executed repeatedly at a predetermined interval.

As shown in FIG. 5, it is determined whether the CNG mode is ongoing at step S21, the CNG mode using CNG as the fuel for use of internal combustion engine 1. The CNG mode with respect to this determination is the CNG mode which should be implemented in the driving area AR2 because of the switch of fuel for use shown in FIG. 4. When the CNG mode is ongoing, the process goes to step S22; otherwise, the processes after the determination are skipped and the routine of this time is terminated.

At step S22, by the air-fuel imbalance inspection of steps S7 and S8 in FIG. 4, it is determined whether abnormal dispersion of air-fuel ratio has occurred. In a case that the abnormal dispersion has occurred, the process goes to step S23; otherwise, the processes after the determination are skipped and the routine of this time is terminated.

At step S23, the cylinder where the abnormal dispersion of air-fuel ratio has occurred is specified out of four cylinders of the internal combustion engine 1. The cylinder where the abnormal dispersion has occurred is referred to as an abnormal cylinder. The number of abnormal cylinders is not limited to one, and a plurality of abnormal cylinders could be specified.

At step S24, it is determined whether the air-fuel ratio of the abnormal cylinder is deviated to a lean side beyond the aim air-fuel ratio (a theoretical air-fuel ratio). The deviation to the lean side of the air-fuel ratio is indicated by reduction of the output. Thereby, it is possible to determine whether the air-fuel ratio of abnormal cylinder is deviated to the lean side or to the rich side. In a case that the air-fuel ratio of abnormal cylinder is deviated to the lean side, the process goes to step S25. In a case that the air-fuel ratio of abnormal cylinder is deviated to the rich side, the process goes to step S26.

At step S25, the fuel injection valve 20A is controlled so that gasoline is added to the abnormal cylinder of the internal combustion engine 1 being operated in the CNG mode. Namely, an incremental correction with different kind of fuel is implemented by the ECU 30 to the abnormal cylinder. The amount of gasoline which is added at this process is appropriately controlled so as to not to become excessive.

At step S26, each of the fuel injection valves 20A, 20B is controlled so that the fuel for use of the abnormal cylinder is switched from CNG to gasoline. Thereby, the internal combustion engine 1 is operated in a state that the abnormal cylinder was provided with gasoline and the other cylinders were provided with CNG.

During the implementation of the CNG mode, when the abnormal dispersion between the air-fuel rations of the cylinders is detected, switching the fuel of all cylinders leads only a situation that gasoline is used after the detection of abnormality. Because of this, a cruising distance becomes short. By a routine shown in FIG. 5, in a case that the abnormal dispersion of the cylinders is detected, the fuel for use of all cylinders is not switched, but for the abnormal cylinder, either fuel addition or switch of fuel for use is implemented. Because of this, an operation object is limited. Accordingly, it is possible to remedy the abnormal dispersion of cylinders, while CNG is used continuously as long as possible and the cruising distance is extended.

However, it could occur that the abnormal dispersion can not be remedied, even if at least one of following operations is executed, the operation of step S25 in FIG. 5 that is addition of gasoline to the abnormal cylinder; and the operation of step S26 that is switch of fuel for use of the abnormal cylinder. Then, the ECU 30 implements a control routine shown in FIG. 6 in parallel with the control routine shown in FIG. 5.

FIG. 6 shows one example of flow chart of control routine in the second embodiment which is implemented in parallel with the control routine shown in FIG. 5. A program of this control routine is stored in the ECU 30 to be read out at appropriate time and implemented repeatedly at a predetermined interval. First, at step S31, it is determined whether the abnormal dispersion of cylinders has not yet been remedied even if the operation of step S25 or step S26 shown in FIG. 5 was implemented. As the result of determination, in a case that the abnormal has not yet been remedied, the process goes to step S32; otherwise, the processes are skipped and the routine of this time is terminated. At step S32, each of the fuel injection valves 20A, 20B is controlled so that the fuel for use of all cylinders 2 is switched from CNG to gasoline. Namely, the driving mode is switched from the CNG mode to the gasoline mode. According to the control routine of FIG. 6, in a case that the remedy of abnormal dispersion is inadequate, as the fuel for use of all cylinders is switched from CNG to gasoline, it is easy to remedy the abnormal dispersion of cylinders.

In the second embodiment, the ECU 30 implements the control routines shown in FIGS. 5 and 6. Thereby, the ECU 30 functions as a combustion control device of the present invention.

The present invention is not limited to the above embodiments, and is possible to be realized as various kinds of embodiments within a subject-matter of the present invention. The inspection in the present invention is not limited to the air-fuel ratio imbalance inspection, and it is also possible to apply the present invention to the other inspection such as an accidental fire inspection, an deterioration inspection to the three-way catalyst and a trouble inspection of oxygen density sensor 33. These inspections are implemented during a drive of the inner combustion engine. Accordingly, in accordance with the driving state of inner combustion engine which becomes unstable, the inspection accuracy becomes worse. Because, these inspections have the characteristic that the inspection accuracy changes depending on the driving areas different from each other.

The above embodiments are for the internal combustion engine which uses CNG as gas fuel and gasoline as liquid fuel by switching them. However, it does not matter which kinds of fuel are used as long as different kinds of fuel are switched. For example, it is also possible to apply the present invention to an internal combustion engine which uses gasoline as liquid fuel and alcohol as liquid fuel, or mix fuel of alcohol and gasoline, by switching between them. In addition, it is possible to apply the present invention even to an internal combustion engine which uses not less than three kinds of fuel by switching them, as long as the fuel for use is correlated to each driving area.

In the second embodiment, the control routines shown in FIGS. 5 and 6 are implemented together with the control routine shown in FIG. 4 of the first embodiment. Namely, the second embodiment is constructed as premises for the first embodiment. However, the control routines shown in FIGS. 5 and 6 can be implemented independently, not as premises for the switch of fuel in the first embodiment. In a case that the second embodiment is implemented independently in this way, the embodiments corresponds to execution embodiments of the following invention 1 and invention 2.

(Invention 1)

A control device for internal combustion engine which has a plurality of cylinders and is constructed so as to use compressed natural gas and hydrocarbon system liquid fuel by switching them for each of the cylinders, wherein the control device for internal combustion engine comprises:

an inspection device which implements an inspection for detecting abnormal dispersion between air-fuel ratios of the cylinders, and when the abnormal dispersion is detected, specifying an abnormal cylinder in which the air-furl ratio is deviated to a lean side or a rich side; and a combustion control device which controls the internal combustion engine so that, in a case that the inspection device has detected the abnormal dispersion while a driving mode using the compressed natural gas as the fuel for use is implemented in all of the cylinders, the hydrocarbon system liquid fuel is added to the abnormal cylinder where the air-fuel ratio is deviated to the lean side, and the fuel for use is switched from the compressed natural gas to the hydrocarbon system liquid fuel for the abnormal cylinder where the air-ratio is deviated to the rich side.

(Invention 2)

An control device for internal combustion engine according to the invention 1, wherein the combustion control device controls the internal combustion engine so that the fuel for use in all of the cylinders is switched from the compressed natural gas to the hydrocarbon system liquid fuel, in a case that the abnormal dispersion is not remedied even if at least either adding the hydrocarbon system liquid fuel to the abnormal cylinder or switching the fuel for use of the abnormal cylinder is implemented.

The invention claimed is:

1. A control device for internal combustion engine which is applied to an internal combustion engine capable of switching a plural kinds of fuel, comprising:
   a storage device which stores information where each fuel for use to be used is correlated to each driving area of the internal combustion engine;
   a fuel switch device which switches the fuel for use based on the information stored in the storage device; and
   an inspection device which implements for each of driving modes different from each other in the fuel for use, an inspection having a characteristic such that inspection accuracy changes depending on the driving areas different from each other, wherein the fuel switch device, when the inspection device implements the inspection, switches the fuel for use so that same level inspection accuracy is ensured in any driving mode, regardless of a correlation between the driving area and the fuel for use correlated by the information.

2. The control device according to claim 1, wherein
first fuel and second fuel are provided as the plural kinds of fuel,
the first fuel and the second fuel are correlated to a first driving area and a second driving area as the fuel for use respectively,
the inspection has a characteristic such that the inspection accuracy of a case where the inspection is implemented in the first driving area is lower the inspection accuracy of a case where the inspection is implemented in the second driving area, and
the fuel switch device switches the fuel for use from the second fuel to the first fuel, when the inspection device should implement the inspection for the driving mode using the first fuel, in a case that the driving mode using the second fuel is ongoing in the second driving mode.

3. The control device according to claim 2, wherein
the first fuel is smaller than the second fuel in an exhaust amount of harmful substance after combustion, and
the first driving area is lower than the second driving area in purification performance of harmful substance.

4. The control device according to claim 3, wherein
compressed natural gas is provided as the first fuel, and hydrocarbon system liquid fuel is provided as the second fuel.

5. The control device according to claim 1, wherein
the internal combustion engine has a plurality of cylinders, and
the inspection device implements a process for detecting abnormal dispersion between air-fuel ratios of the cylinders.

6. The control device according to claim 2, wherein
the internal combustion engine is constructed so as to use mix fuel where the first fuel and the second fuel are mixed, and the control device further comprises:
a restriction time control device which controls the internal combustion engine in a case that the inspection device should implement the inspection for the driving mode using the first fuel, so that the fuel for use is changed to the mix fuel, when ongoing is the driving mode using the second fuel in the second driving area and usage of the first fuel should be restricted; and
an inspection result presumption device which presumes an inspection result for the driving mode using the first fuel in a state that the internal combustion engine is controlled in a driving mode using the mix fuel by the restriction time control device, by comparing an inspection result of the inspection implemented for the driving mode by the inspection device to an inspection result for the driving mode using the second fuel.

7. The control device according to claim 1, wherein
compressed natural gas and hydrocarbon system liquid fuel are provided as the plural kinds of fuel,
the internal combustion engine has a plurality of cylinders and capable of switching the fuel for use for each cylinder, and
the inspection device implements, as the inspection, processes of detecting abnormal dispersion between air-fuel ratios of the cylinders, and when the abnormal dispersion is detected, specifying an abnormal cylinder in which the air-furl ratio is deviated to either a lean side or a rich side, wherein
the control device further comprises
a combustion control device which controls the internal combustion engine so that, in a case that the inspection device has detected the abnormal dispersion while a driving mode using the compressed natural gas as the fuel for use is implemented in all of the cylinders, the hydrocarbon system liquid fuel is added to the abnormal cylinder where the air-fuel ratio is deviated to the lean side, and the fuel for use is switched from the compressed natural gas to the hydrocarbon system liquid fuel for the abnormal cylinder where the air-ratio is deviated to the rich side.

8. The control device according to claim 7, wherein the combustion control device controls the internal combustion engine so that the fuel for use in all of the cylinders is switched from the compressed natural gas to the hydrocarbon system liquid fuel, in a case that the abnormal dispersion is not remedied even if at least either adding the hydrocarbon system liquid fuel to the abnormal cylinder or switching the fuel for use of the abnormal cylinder is implemented.

* * * * *